Wrap# UNITED STATES PATENT OFFICE.

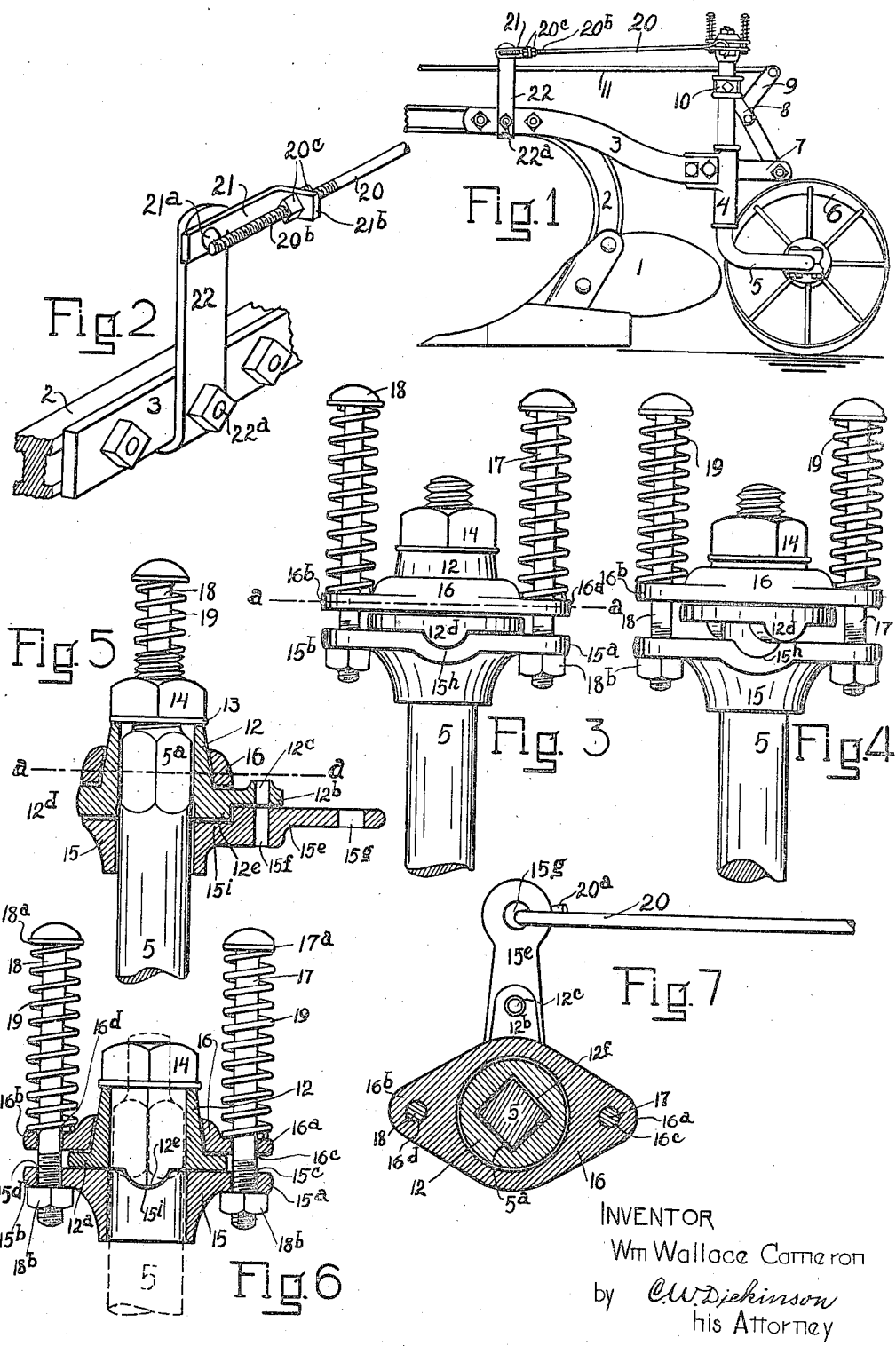

WILLIAM WALLACE CAMERON, OF LA CROSSE, WISCONSIN.

PLOW.

1,277,542.

Specification of Letters Patent.

Patented Sept. 3, 1918.

Application filed April 23, 1917. Serial No. 164,039.

*To all whom it may concern:*

Be it known that I, WILLIAM WALLACE CAMERON, a citizen of the United States of America, and residing at 1008 Rose street, in the city of La Crosse, county of La Crosse, and State of Wisconsin, have invented certain new and useful Improvements in Plows, of which the following is a true specification.

The invention relates to plows, and more especially to wheel-plows.

The object of the invention is to afford improved means for holding the rear sustaining wheel in wheeled plows in fixed position to travel behind the plow in a forward direction while straight ahead plowing is being done, and to release the holding means when turning corners, and the like; also to permit of some adjustment of the direction of travel of the wheel in order to carry the rear of the plow more or less toward or from the furrow wall to secure proper "side suction" to aid in keeping the plow in proper plowing position.

Another object of the invention is to provide a plow with the above features, and that will permit of adjustment of the direction of travel of the wheel to be made during the travel of the plow.

Another object of the invention is to provide a plow incorporating the above features, in which the parts shall be simple, easy of access and adjustment, and be simple and easy of construction.

In the drawings, Figure 1 is a side view of the rear end of a wheeled plow embodying the invention; Fig. 2 is a perspective view of the parts shown in the left hand side of Fig. 1; Fig. 3 is a detail of the parts at the top of the shank or axle for the rear wheel, taken from the plowed ground side of the plow, and showing the wheel locked against turning; Fig. 4 is the same view, showing the parts in unlocked position; Fig. 5 is a detail of the same parts, partly in vertical cross section, looking from the front; Fig. 6 is a detail, partly in section, of the parts as shown in Fig. 3; Fig. 7 is a horizontal cross section taken on the line *a—a* of Fig. 3.

In the drawings 1 indicates a plow bottom, 2 a plow beam therefor, 3 a bracket or rearward extension for the beam, 4 a vertical socket secured to said bracket, 5 an axle having a vertical shank portion passing rotatably through the socket, and having a squared upper end $5^a$; 6 is a rear sustaining wheel rotatably mounted on the lower outer end of the axle; 7, 8, 9, 10, 11, are parts for lifting the rear end of the plow carrying structure with relation to the wheel, connecting to a shifting means at the front end of the plow, not shown herein.

12 is a thimble having a squared inner opening to fit over the squared upper end $5^a$ of the shank. The extreme upper end of the shank is threaded and receives the washer 13 and nut 14 by means of which the thimble 12 is held securely and rigidly upon the squared end $5^a$ of the shank. Extending laterally from the base of the thimble is an annular flange $12^a$, and on the lower face of the collar and flange are laterally extending diametrically opposed lugs or ribs $12^c$ and $12^d$. This thimble has a laterally extending arm $12^b$ having the hole $12^e$ therein.

15 indicates a collar loosely mounted on the shank below the thimble 12 and having a pair of ears $15^a$ and $15^b$ extending fore and aft of the shank, and pierced with holes $15^c$ and $15^d$; and a laterally extending arm $15^e$ having holes $15^f$ and $15^g$ therein. In normal position the hole $15^f$ registers with the hole $12^e$. In the upper face of this collar are diametrically opposed grooves $15^h$ and $15^i$, adapted to register and lock with the lugs $12^d$ and $12^e$, to lock the shank against turning.

16 indicates a collar loosely fitting about the thimble 12 and upon the upper face of the flange $12^a$, having fore and aft extending ears $16^a$ and $16^b$, pierced with the holes $16^c$ and $16^d$ that normally register with the holes $15^c$ and $15^d$ of the collar 15.

Passing through the holes $15^c$ and $16^c$ and $15^d$ and $16^d$ respectively, are headed bolts 17 and 18, threaded at their lower ends to receive the nuts $18^b$ below the collar 15. 19 are springs interposed between the bolt heads and the upper face of the ears of the collar 16, the tension of which is regulated by the nuts $18^b$ as required.

Upon the plow carrying structure, as upon the part 3, is an upright bracket 22, secured by a nut $22^a$. A right-angled support 21 is at its forward end pivotally connected to the bracket 22. The rear, angled, portion $21^b$ of 21 is pierced with a hole, as shown in Fig. 2, through which passes the forward end of a rod 20, held in adjusted relations to the support 21 by its threads and the nuts 20°. The rear end of the rod 20 is pivotally connected with the arm 15° by the hook end 20ª passing through the hole 15ᵍ of the collar 15.

The collar 15 is held in a fixed lateral position by its connection through the arm 15° and the rod 20 and support 21 with the rigid bracket 22 of the plow carrying structure. In normal position, when the plow is traveling forwardly in a direct line, the lugs 12ᵈ and 12° are kept in mesh or locking relation with the grooves 15ʰ and 15ⁱ by the upward tension of the springs 19 exerted upon the face of the ears 16ª and 16ᵇ and the heads of the bolts, whereby the nuts of the bolts draw the collar 15 upwardly and keep the lugs and grooves in lock, thereby preventing the shank, and with it the wheel, from lateral turning, so long as the plow is traveling in a straight forward direction. The tension of the springs may be made sufficient to prevent the unlocking of the lugs and grooves by the ordinary incidental swinging of the plow. But if the plow is turned as in short angles and corners, the lateral pressure of the rounded surfaces of the lugs and grooves will be sufficient to overcome the tension of the springs, lower the collar 15, permit the lugs to emerge from the grooves, and automatically permit the lugs, thimble and shank, and with them the wheel 6, to turn laterally with relation to the collar 15 and the plow carrying structure.

As soon as the plow resumes straight forward travel, the trend of the wheel will automatically swing the wheel and shank back into fore and aft relation, the lugs and grooves will again coincide, and the springs will draw them again into yieldable locking relation.

The thread and nut adjustment at the forward end of the rod 20 permits of adjusting the collar 15 laterally, thereby throwing the grooves into true longitudinal alinement with the plow, or turning them more or less at an angle therewith in either direction, thereby changing the direction of travel of the wheel as may be desired to hold the rear of the plow 1 to or from the land and keep it in proper position to cut sufficiently into the land and make the plow run true. It will be observed that by placing the controlling parts upon the top of the shank and the rod 20 above the plow, this shifting of the direction of the travel of the wheel may easily be made while the plow is moving and without the least danger of losing control of the parts; and also that the tension of the springs 19 may be similarly adjusted while the plow is in motion. The pivotal connection of the adjusting rod 20 with the plow carrying structure permits the controlling parts to work freely whether the plow is in raised or in lowered position.

If it is desired to hold the plow rigidly against unlocking and the wheel from turning with relation to the plow carrying structure when the plow is turning, this can be done by inserting a pin through the registered holes 12° and 15ᶠ, whereby the shank 5 will be rigidly locked with the stationary arm 15°.

It is manifest that departures from the precise embodiment of the invention shown and described in the drawings and specification herein might be made without departing from the spirit of the invention.

Having shown and described my invention, what I claim is:

1. In a plow, the combination of a plow carrying structure, with a rear sustaining wheel, a connection between the wheel and the structure comprising an axle having a vertical rotatable shank means for yieldingly locking the shank against rotation, and means connected with said locking means for shifting the direction of travel of the wheel during the travel of the plow and holding it in shifted position, the shank turning independently of the locking means when unlocked.

2. In a plow, the combination of a plow carrying structure, with a rear sustaining wheel, a connection between the wheel and the structure comprising an axle having a vertical rotatable shank, means for locking the shank against rotation, and a connection between the locking means and the structure for shifting the direction of travel of the wheel during the progress of the plow and holding it in shifted position, the shank turning independently of the locking means when unlocked.

3. In a plow, the combination of a plow carrying structure with a rear sustaining wheel, a connection between the wheel and the structure comprising an axle having a vertical rotatable shank, means for fixedly controlling the direction of travel of the wheel comprising a collar loosely mounted on the shank, an adjustable connection between the collar and the carrying structure, and means for locking the collar to the shank, the connection retaining control of the collar during the adjusting process.

4. In a plow, the combination of a plow carrying structure, with a rear sustaining wheel, a connection between the wheel and the structure comprising an axle having a vertical rotatable shank, means for fixedly controlling the direction of the travel of the wheel comprising a collar loosely mounted on the shank, an adjustable connection between the collar and the carrying structure, and means for yieldably locking the collar to the shank.

5. In a plow, the combination of a plow carrying structure, with a rear carrying wheel, a connection between the wheel and the structure comprising an axle having a vertical rotatable shank, means for fixedly controlling the direction of travel of the wheel comprising a collar loosely mounted on the shank, an arm on the collar, an adjustable connection between the arm and the carrying structure, and means for yieldably locking the collar to the shank comprising a spring.

6. In a plow, the combination of a plow carrying structure, with a rear sustaining wheel, a connection between the wheel and the structure comprising an axle having a vertical rotatable shank, means for controlling the direction of travel of the wheel comprising a collar loosely mounted on the shank, an adjustable connection between the collar and the carrying structure, and means for automatically unlocking the collar from the shank.

7. In a plow, the combination of a plow carrying structure, with a rear carrying wheel, a connection between the wheel and the structure comprising an axle having a vertical rotatable shank, means for controlling the direction of travel of the wheel comprising a collar loosely mounted on the shank, an arm on the collar, an adjustable connection between the arm and the structure comprising a rod having one end pivoted to the arm and the other end adjustably connected to a fixed point on the structure, and means for yieldably locking the collar to the shank.

8. In a plow, the combination of a plow carrying structure, with a rear sustaining wheel, a connection between the wheel and the structure comprising an axle having a vertical rotatable shank, means for controlling the direction of travel of the wheel comprising a collar loosely mounted on the shank, an arm on the collar, a fixed support on the structure, a rod having one end pivotally attached to the arm and the other end adjustably connected to the support by a screw and nuts, and means for yieldably locking the collar to the shank.

9. In a plow, the combination of a plow carrying structure, with a rear carrying wheel, a connection between the wheel and the structure comprising an axle having a vertical rotatable shank, means for controlling the direction of travel of the wheel comprising a collar loosely mounted on the shank, an arm on the collar, a support pivoted on the structure for vertical movement, a rod having one end pivotally attached to the arm and the other end adjustably connected to the support by a thread and nuts on the rod, and means for yieldingly locking the collar to the shank.

10. In a plow, the combination of a plow carrying structure, with a rear sustaining wheel, a connection between the wheel and the structure comprising an axle having a vertical rotatable shank, means for yieldingly locking the shank against rotation comprising a lug rigid on the shank, a collar loosely mounted on the shank and having a groove adapted to lock with the lug, a spring for holding the lug and the groove in locked relation, and means for holding the collar laterally rigid with respect to the carrying structure.

11. In a plow, the combination of a plow carrying structure with a rear carrying wheel, a connection between the wheel and the structure comprising an axle having a vertical rotatable shank, means for yieldingly holding the shank against rotation comprising a lug on the shank, a collar loosely mounted on the shank on one side of the lug and having a groove adapted to lock with the lug, a pair of opposed ears on the collar having openings therein, a collar loosely mounted on the shank on the opposite side of the lug and having ears coinciding with the ears of the first named collar, and holes therein, bolts through the holes having adjusting nuts, springs between the heads of the bolts and one of the collars whereby the lug and the groove may be yieldingly locked with each other, and means for holding one of the collars rigid with the carrying structure.

12. In a plow, the combination of a plow carrying structure, with a rear carrying wheel, a connection between the wheel and the structure comprising an axle having a vertical rotatable shank, means for yieldably holding the shank against rotation comprising a thimble rigidly secured to the top of the shank and having lugs on its lower face, a collar loosely mounted on the shank below the thimble and having grooves adapted to engage the lugs, laterally opposed ears on the collar having holes therein, a collar loosely mounted on the thimble above the lugs, ears thereon above the ears of the lower collar, having openings through the ears, bolts passing through both pairs of openings, adjusting nuts on the bolts, springs between the heads of the bolts and the ears of the upper collar, and a connection for holding one of the collars in fixed lateral relation with the structure.

13. In a plow, the combination of a plow carrying structure, with a rear carrying wheel, a connection between the wheel and the structure comprising an axle having a vertical rotatable shank, means for holding the shank against rotation comprising a collar loosely mounted on the shank and having an arm, a connection between the arm and the structure for holding the collar laterally rigid on the structure, a yieldable locking connection between the collar and the shank, and means for holding the shank laterally rigid with the structure comprising a locking connection between the shank and the arm.

14. In a plow, the combination of a plow carrying structure with a rear carrying wheel, a connection between the wheel and the structure comprising an axle having a vertical rotatable shank, means for holding the shank against rotation comprising a collar loosely mounted on the shank and having an arm, a connection between the arm and the structure for holding the collar laterally rigid with the structure, a yieldable locking connection between the collar and the shank, and means for holding the shank laterally immovably rigid with the structure comprising an arm rigid on the shank, and a locking connection between the two arms.

15. In a plow, the combination of a plow carrying structure, with a rear carrying wheel, a connection between the wheel and the structure comprising an axle having a vertical rotatable shank, a lug on the shank, a collar loosely and vertically slidably mounted on the shank, means for holding the collar laterally rigid, coacting locking means on the collar and on the lug, and means for vertically shifting the collar to bring the locking means into locking relation.

16. In a plow, the combination of a plow carrying structure, with a rear carrying wheel, a connection between the wheel and the structure comprising an axle having a vertical rotatable shank, a lug on the shank, a collar loosely mounted and vertically slidable on the shank, means for holding the collar laterally rigid, interlocking means on the collar and on the shank respectively, and means for vertically shifting the collar to bring the interlocking means into locking relation whereby the shank will be yieldingly held against rotation.

17. In a plow, the combination of a plow carrying structure, with a rear sustaining wheel, a connection between the wheel and the structure comprising an axle having a vertical rotatable shank, and means for fixedly controlling the direction of travel of the wheel comprising an adjustable connection between the shank and the structure, the connection retaining rigid control of the shank during the adjusting process.

18. In a plow, the combination of a plow carrying structure, with a rear sustaining wheel, a connection between the wheel and the structure comprising an axle having a vertical rotatable shank, and means for fixedly controlling the direction of travel of the wheel comprising an adjustable connection between the shank and the structure, the connection retaining control of the shank during the adjusting process and permitting vertical shift of the shank with respect to the structure during all of the plowing processes.

WILLIAM WALLACE CAMERON.